United States Patent
Wittmann

(10) Patent No.: US 9,500,550 B2
(45) Date of Patent: Nov. 22, 2016

(54) SYSTEM, METHOD AND APPLICATION FOR ESTIMATING PNEUMATIC PRESSURE STATE OF VEHICLE TIRES USING A HANDHELD DEVICE

(71) Applicant: NEOMATIX LTD., Tel Aviv (IL)

(72) Inventor: Kfir Wittmann, Tel Aviv (IL)

(73) Assignee: NOMATIX LTD., Tel Aviv (IL)

( * ) Notice: Subject to any disclaimer, the term of this patent is extended or adjusted under 35 U.S.C. 154(b) by 273 days.

(21) Appl. No.: 14/357,063

(22) PCT Filed: Nov. 8, 2012

(86) PCT No.: PCT/IL2012/050446
§ 371 (c)(1),
(2) Date: May 8, 2014

(87) PCT Pub. No.: WO2013/069014
PCT Pub. Date: May 16, 2013

(65) Prior Publication Data
US 2014/0309845 A1    Oct. 16, 2014

Related U.S. Application Data

(60) Provisional application No. 61/556,837, filed on Nov. 8, 2011.

(51) Int. Cl.
*G01M 17/00* (2006.01)
*G01L 17/00* (2006.01)

(52) U.S. Cl.
CPC .................................. *G01L 17/00* (2013.01)

(58) Field of Classification Search
CPC ............ B60K 35/00; B60K 2350/928; B60K 28/063; B60K 37/06
USPC ..................................................... 701/36, 31.9
See application file for complete search history.

(56) References Cited

U.S. PATENT DOCUMENTS

| | | | | |
|---|---|---|---|---|
| 6,498,967 B1 * | 12/2002 | Hopkins | ............ | B60C 23/0408 340/442 |
| 6,823,728 B1 * | 11/2004 | Barnes | ................. | G01L 17/005 73/146 |
| 2002/0075145 A1 * | 6/2002 | Hardman | ........... | B60C 23/0433 340/442 |
| 2009/0091633 A1 | 4/2009 | Tamaru | | |
| 2009/0284637 A1 * | 11/2009 | Parulski | ............ | H04N 1/00183 348/333.12 |

(Continued)

FOREIGN PATENT DOCUMENTS

| | | | | | |
|---|---|---|---|---|---|
| FI | EP 1172236 A2 * | 1/2002 | ........ | B60C 23/0401 |
| FR | 2743632 | * | 7/1997 | ............ | G01L 17/00 |
| FR | 2743632 A1 | | 7/1997 | | |

(Continued)

*Primary Examiner* — Redhwan K Mawari
(74) *Attorney, Agent, or Firm* — The Roy Gross Law Firm, LLC; Roy Gross

(57) ABSTRACT

System method and computer operable application for estimating pneumatic pressure in tires of vehicles, using a handheld device having at least one camera installed therein that allow acquiring an image of a wheel of a vehicle, using the camera of the handheld device, analyzing the acquired image for estimating value of at least one parameter of the tire of the wheel in the image, where the parameter is related to pneumatic pressure of the tire, estimating pneumatic pressure state of the respective tire by using the parameter and presenting an indication of the estimated pneumatic pressure state.

19 Claims, 10 Drawing Sheets

(56) References Cited

U.S. PATENT DOCUMENTS

2014/0067193 A1\* 3/2014 Gokyu .................. B60C 11/246
   701/31.9
2014/0288859 A1\* 9/2014 Wittmann ............. G01L 17/005
   702/55

FOREIGN PATENT DOCUMENTS

JP    2005096554 A    4/2005
WO   2013/065049 A1   5/2013

\* cited by examiner

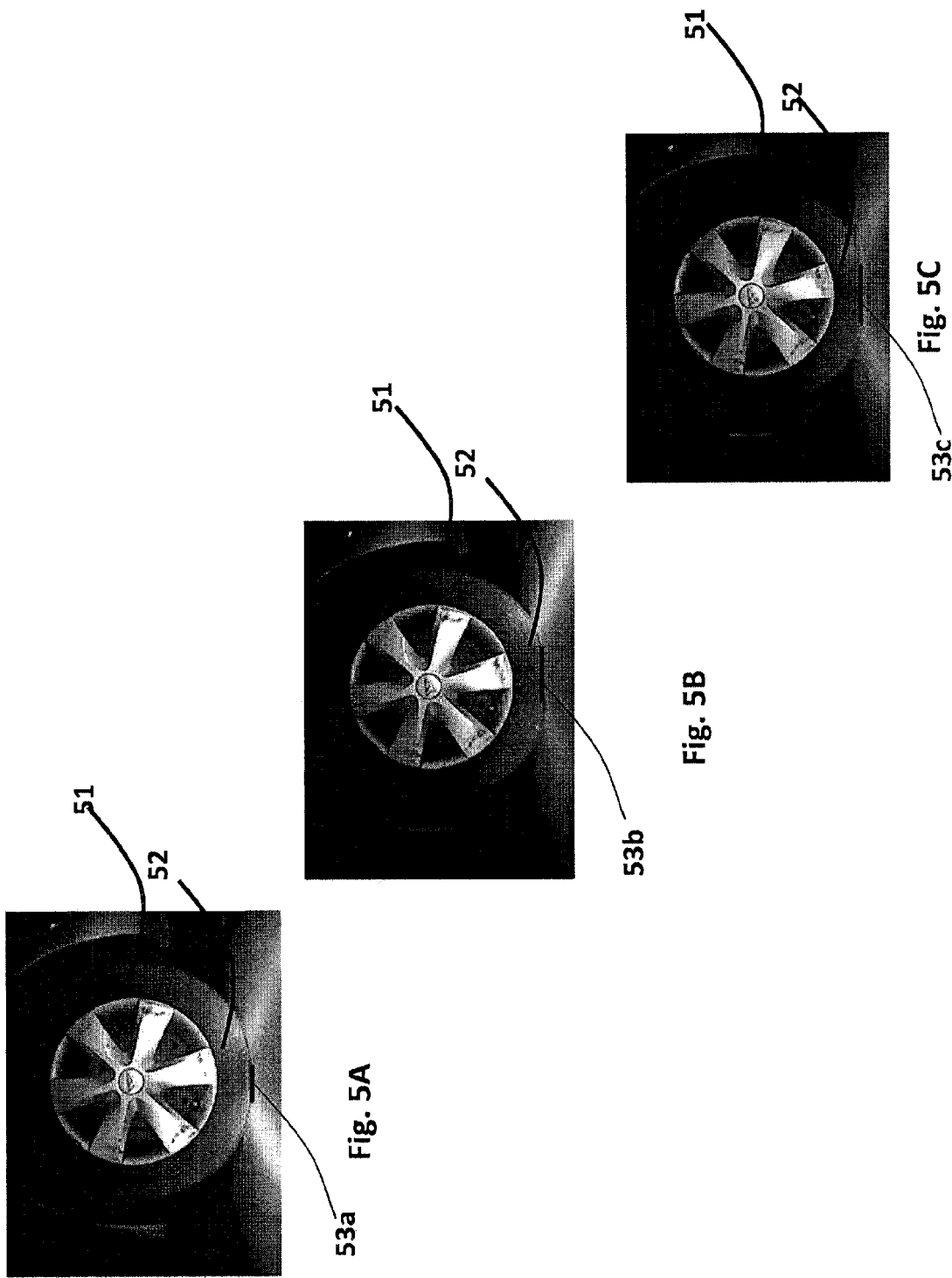

SYSTEM, METHOD AND APPLICATION FOR ESTIMATING PNEUMATIC PRESSURE STATE OF VEHICLE TIRES USING A HANDHELD DEVICE

CROSS-REFERENCE TO RELATED PATENT APPLICATIONS

This application is a national phase of PCT application No. PCT/IL2012/050446 filed Nov. 8, 2012, which claims the benefit of Provisional patent application No. 61/556,837 filed on Nov. 8, 2011, which is incorporated herein by reference in its entirety.

FIELD OF THE INVENTION

The present invention generally relates to systems and methods for estimating pneumatic pressure in vehicles' tires and more particularly to systems, methods and applications for estimating tires pneumatic pressure state using handheld devices.

BACKGROUND OF THE INVENTION

The pneumatic pressure (inflation state) of a vehicle's tires dramatically influences various aspects such as, inter alia, driving safety, fuel consumption and life expectancy of the tires. An underinflated or overinflated tire will wear off much quicker than a tire that is kept inflated at the manufacturer recommended pneumatic pressure. Another aspect influenced by the inflation state of the vehicle's tires is the driving experience. Properly inflated tires insure a much more accurate steering, shorter acceleration periods and improved vehicle stability.

Public awareness has greatly increased, and in the United States, legislation such as the TREAD Act, requires passenger cars to be equipped with Tire Pressure Monitoring Systems (TPMS). Similar legislation is expected to enter to European Union, and many manufacturers of cars, tires and vehicle accessories and safety equipment are rising to the challenge.

SUMMARY OF THE INVENTION

According to some aspects of the invention, there is provided a system for estimating pneumatic pressure state of vehicle tires using a handheld device such as a smartphone, tablet device or any other electronic device having at least one camera installed therein. The system includes: (i) an image acquisition module configured for allowing a user to acquire an image of a vehicle wheel, using camera and image acquisition functionality of the handheld device, wherein the image acquisition module includes a user interface that provides visual graphics configured to assist the user in directing the positioning of the handheld device in respect to the respective wheel for acquiring its image; (ii) an image analysis module configured for receiving an image of a respective wheel from the image acquisition module and analyzing the respective image for estimating the pneumatic pressure state of a tire of the wheel in thereof; and (iii) a presentation module for presenting the estimated pneumatic pressure state of the respective tire via at least one output device of the handheld device.

Optionally, the image analysis is carried out by using at least one processor of the respective handheld device.

Additionally or alternatively, the system further includes a communication module for communicating with at least one remote server through at least one communication link provided by the handheld device, wherein the image analysis is carried out by using at least one processor of the at least one remote server.

According to some embodiments, the image analysis includes measuring value of at least one predefined parameter of the respective tire from its respective image and comparing the measured parameter value with a reference known parameter value, wherein the system further enables accessing at least one database comprising known parameters values. The one or more parameters may include: footprint length and/or sidewall height, each indicates the length or height, respectively at the bottom part of the tire that is in contact with the ground.

The user interface may further enable a user to input information through at least one input device of the handheld device, wherein the information is indicative inter alia of a type of the vehicle, wherein the estimation of the tire pneumatic pressure state is carried out according to the input information. The user interface may also be configured to allow inputting location and/or size of the respective wheel, wherein the pneumatic pressure estimation is carried out also according to the location and/or size of the respective wheel.

The system may also be configured to extract data from at least one positioning system of the handheld device, allowing the user interface to use the positioning data for assisting the user in positioning the handheld device and the image analysis module to use the extracted data for correcting image distortions caused due to inaccuracy in the positioning of the device in respect to the wheel when image was acquired to improve pneumatic pressure state estimation.

The system is optionally also configured to enable retrieving additional data from other applications and/or devices of the handheld device for improving estimation of the pneumatic pressure state of the respective tire. For example, the devices and applications include: global positioning system (GPS) of the handheld device.

The image acquisition module and user interface may further enable retrieval of wheel images from a data storage for analyzing thereof.

According to other aspects of the invention, there is provided a method of estimating pneumatic pressure in tires of vehicles, using a handheld device having at least one camera installed therein, wherein the method includes: (a) acquiring at least one image of at least one of wheel of a vehicle, using at least one camera of the handheld device; (b) analyzing each respective image of each tire of the respective wheel for estimating value of at least one parameter of the tire related to pneumatic pressure thereof; (c) estimating pneumatic pressure state of the respective tire by using the parameter; and (d) presenting an indication of the estimated pneumatic pressure state, using at least one output device of the handheld device.

Optionally, the at least one parameter includes at least one of: footprint length; sidewall height.

Additionally or alternatively, the method further includes identifying: type of the respective vehicle, location of the tire of the respective image, and size of the tire of the respective image, wherein the pneumatic pressure estimation is carried out by also using the vehicle type and tire location and size to compare estimated pneumatic pressure state with a reference pneumatic pressure of a properly inflated tire of the same vehicle type and tire location and size. To do so. The method may further include receiving input data indicative of the type of the respective vehicle and the tire configuration, wherein the identification optionally includes automatically identifying the vehicle by using at least one sensor for sensing at least one parameter associated with the type of the respective vehicle.

According to some embodiments, the method further includes identifying an accuracy level of the positioning of the wheel in respect to the handheld device and camera thereof by using real time or near real time image analysis of the image using a predefined picture frame as a reference frame and by identifying outer perimeter of the wheel in the image in the frame. In this case, the acquiring of the image of the wheel may be done automatically once the accuracy level exceeds predefined criteria. Additionally or alternatively, once the accuracy level exceeds predefined criteria an indication thereof is presented over a screen of the handheld device through the user interface.

The method optionally further includes transmitting an alert message to the handheld device of the respective user, wherein the message is indicative of the pneumatic pressure state of the respective tire.

The method optionally further includes retrieving data from at least one data source through the handheld device for estimating temperature change of the respective tire, wherein the estimating of the pneumatic pressure state of the respective tire is carried out also according to the estimated temperature change thereof.

The method additionally or alternatively further includes monitoring the user's vehicle tire by recording each event of tire pneumatic pressure estimation and its respective timing.

The method may further include directing a user in positioning of the handheld device in respect to the respective wheel for acquiring its image by using camera functionalities of the handheld device and by using a user interface that uses visual graphics over the presentation of the camera to assist the positioning before acquiring of the wheel's image.

The method may further include retrieving a wheel image from data storage.

According to other aspects of the invention, there is provided a computer operable application for estimating pneumatic pressure state of vehicle tires using a handheld device having at least one camera installed therein, wherein the application includes: (i) an image acquisition module configured for allowing a user to acquire an image of a vehicle wheel, using camera and image acquisition functionality of the handheld device, wherein the image acquisition module comprises a user interface that provides visual graphics configured to assist the user in directing the positioning of the handheld device in respect to the respective wheel for acquiring its image; (ii) an image analysis module configured for receiving an image of a respective wheel from the image acquisition module and analyzing thereof for estimating the pneumatic pressure state of a tire of the wheel in the respective image; and (iii) a presentation module for presenting the estimated pneumatic pressure state of the respective tire via at least one output device of the handheld device.

BRIEF DESCRIPTION OF THE DRAWINGS

FIGS. 5A-5C include documented pictures showing how the pneumatic pressure level of a tire influences the footprint of the tire: FIG. 5A shows a photograph of a vehicle's tire inflated to 34 PSI (pounds per square inch); FIG. 5B shows a photograph of a vehicle's tire inflated to 24 PSI; and FIG. 5C shows a photograph of a vehicle's tire inflated to 15 PSI.

FIG. 6A shows a photograph of a vehicle's tire inflated to 39 PSI (pounds per square inch); FIG. 6B shows a photograph of a vehicle's tire inflated to 27 PSI; and FIG. 6C shows a photograph of a vehicle's tire inflated to 15 PSI.

DETAILED DESCRIPTION OF THE INVENTION

Figure 1:
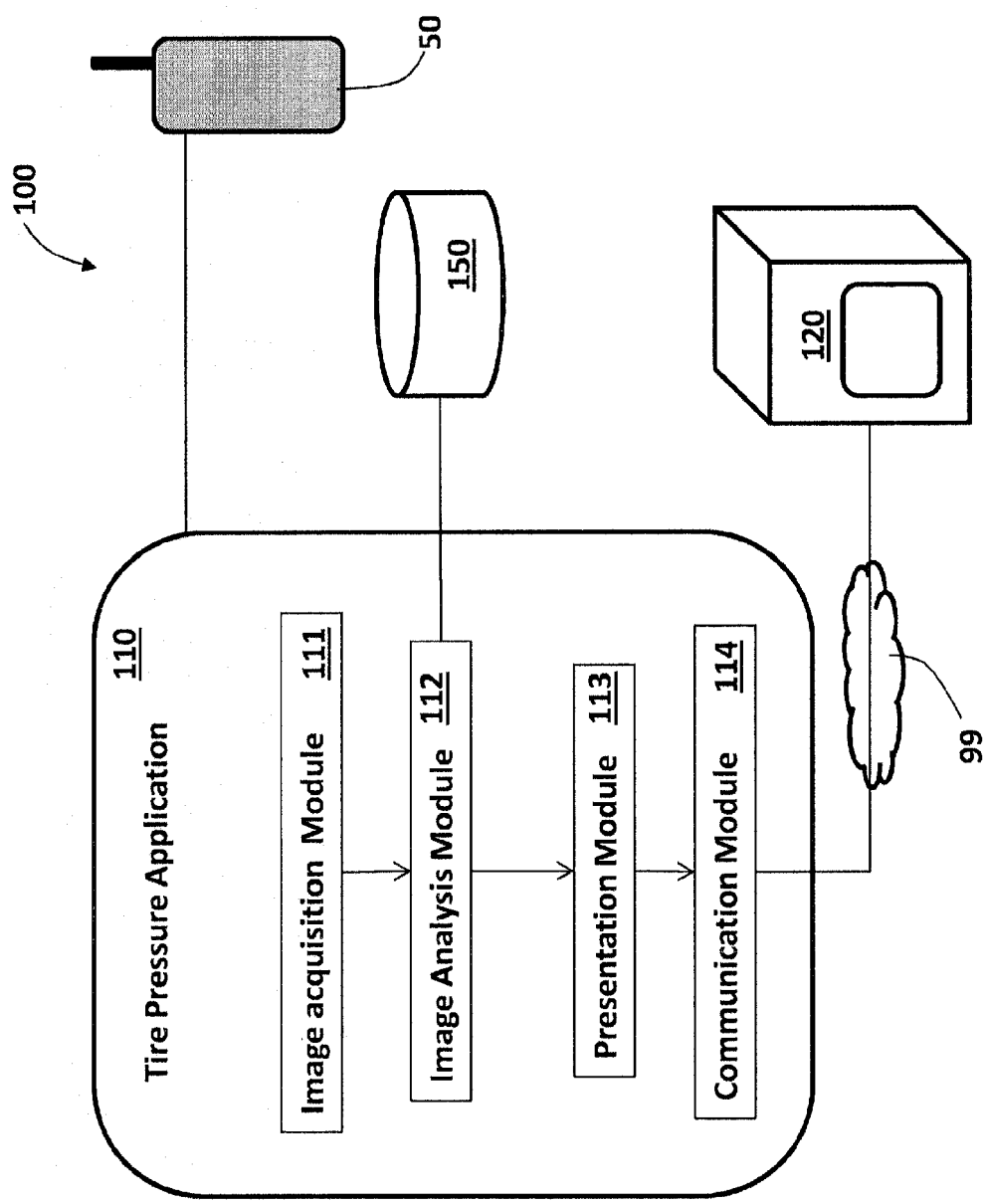
FIG. 1 is a schematic illustration of a system for estimating and presenting pneumatic pressure in vehicles' tires using a handheld device, according to some embodiments of the present invention.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention, in some embodiments thereof, provides methods, systems and applications for estimating pneumatic pressure state (inflation rate) of tires of vehicles, using handheld devices such as smartphones, tablet devices, laptop computers and the like that are equipped with one or more cameras, for allowing users to be able to easily photograph or scan their vehicles' wheels and be acknowledged of the pressure level of the tires thereof after photographing or scanning the wheel. The system and application provides an easy to use graphical user interface that used the camera functionality and presentation features as well as showing one or more markers over the presented imagery to allow the user to easily position the camera in respect to the wheel. The positioning is made to allow the wheel in acquired to be as proportional as possible to the frontal side of the wheel having as little orientation and tilting distortions as possible. This means that the focal axis of the camera is as coaxial as possible to the main axis of the wheel around which it rotates.

The term "pneumatic pressure state" of a tire refers to any indication of the inflation state of the tire such as for example the actual value of the pneumatic pressure of the tire (e.g. in PSI), a parameter that is influenced by the inflation rate of the tire such as the portion of the tire's external periphery that is in contact with the ground (footprint) and the like.

The systems, methods and applications of the present invention allow users having standard handheld devices equipped with a camera to photograph the wheel its tire inflation state they wish to check and use a designated estimation application operable through their handheld devices to find out if the tire that has been photographed is properly, under or over inflated in a short span of time and in an easy, fun, contactless and comfortable manner.

The application may be a web application operated by one or more remote servers or a personal application that the user installs at his/her personal handheld device for operation thereof only by his/her own device. Alternatively, the application can be downloaded from an application downloading website where some functions of the application such as the acquiring of images and the outputting of the estimation results are carried out by the user's device and some at the remote server.

In embodiments of the present invention, a vehicle is registered in a Smartphone application including its tire and rim configuration. Said vehicle is found in a computer database where a minimal sidewall height is saved along with parameters for calculating equivalent pressure according to a known sidewall height. Tire sidewall height can be measured using the camera feature of a Smartphone or other camera equipped handheld devices such as but not limited to tablets and PDAs. Correction for tire temperature may be applied by adjusting the measured sidewall height according to the equation:

COLD_SIDEWALL_HEIGHT=HOT_SIDEWALL_HEIGHT*REF_TEMP [$K$]/TIRE_TEMP[$K$]

Or by calculating a cold equivalent pressure using the following equation:

COLD_PRESSURE=HOT_PRESSURE*REF_TEMPERATURE[$K$]/TIRE_TEMPERATURE[$K$]

Corrections may also be applied as rules of thumb for trip categories taking into account trip time distance, typical speed and weight loading. Another advantage of the present invention is that the results are sent to a computer server that also saves the results so that data can easily be accessed, intervals between inspections can be monitored, and user may be notified if a defined amount of time has passed since the last time the tires were checked. In addition, consistent tire problems may be discovered and faulty and punctured tires may also be detected.

According to some embodiments, the application may operate a special user interface (UI) such as a graphical user interface (GUI) for allowing the user, inter alia, to easily position the camera (e.g. by positioning the handheld device in which the camera is installed) in respect to the stationary positioning of a wheel of the vehicle to ultimately position them in respect to one another such that the camera and wheel are substantially coaxial to one another and such that the entire wheel is captured in a predefined frame showing on the device's screen. To allow this, the GUI is actually using all functionality and presentation platform already existing in the handheld device. When entering the application the standard imagery presentation of the camera according to applications already provided in the handheld device showing what the camera detects in real time over the screen is used where a GUI frame and a centralizing marker appears (such as a cross or one or more circles) in the middle of the frame.

Alternatively, a designated video streaming program of the application is used having the GUI options provided thereby. In this case the designated program allows presenting in real time the video stream captured by the handheld device's camera along with the visual graphics that help the user to position the camera in respect to the wheel in an optimal manner.

The wheel image should be entirely captured within the frame and its center should be located at the mark so that the application will be able to approve the acquisition of its image to further proceed with the processing thereof. According to some embodiments, the application allows analyzing only partial image of the wheel, provided that this partial image includes the lower part of the wheel that contacts the ground/road.

Once the image of the wheel is acquired it is analyzed to measure one or more parameters of the tire of the wheel in the image such as the sidewall height or footprint length to estimate the state of its pneumatic pressure. The term "footprint length" refers to the length of the part of the wheel's outer perimeter that is in contact with the ground. The term "sidewall height" refers to the height of the tire at its bottom part taken as the shortest distance between the central point of its outer perimeter that is in contact with the ground and its inner perimeter in contact with the rim. The footprint parameter is shown and explained in reference to FIGS. 5A-5C (see below); and the sidewall height parameter is shown and explained in reference to FIGS. 6A-6C (below).

According to some embodiments the system, application and method also enable measuring ambient temperature, barometric pressure, accessing weather reports and forecasts, and the like, for assessing vehicle weight, passenger load and tire temperature to compare the estimated pneumatic pressure of the tire with a reference properly inflated tire taking into account other characteristics of the vehicle such as its weight, estimated tire temperature and the like. The application, for example may retrieve information from devices and other applications of the handheld device such as GPS (global positioning system) location, light exposure, time in the day and date, autofocus information, acceleration, tilt, attitude and any information that can be obtained using a device connected to the Internet. This information can then be used to improve identification of over/under inflated tires as well as assist users with taking corrective action.

Manufacturers typically recommend a cold inflation pressure and therefore it is important to understand that many drivers measure the pressure of their tires after a trip, which warms up the tires, and in fact, driving at high speeds for a long time can heat up the tires in a way that the pressure increases in as much as three to four PSI. If we take for instance a car with a cold inflation pressure of 24 [PSI] that heated up during driving from 5 degrees Celsius to 45 degrees Celsius, then the measured pressure of the heated tire will be over 27 [PSI]. Therefore, the temperature change from a reference temperature to the measured tire temperature needs to be taken into account, either by correcting the reference pressure to which the estimated one is compared to or by adjusting the measurements and estimations carried out by the application.

In some embodiments of the present invention, the reference temperature is the measured ambient temperature at the place of inspection and in some embodiments of the present invention the reference temperature may be a low temperature obtained from a weekly or daily weather forecast or any other temperature that best describes the temperature of the tire in its cold condition. If equipped with such a feature, the handheld device may directly measure the respective tire's pressure state to perform this correction, but as most handheld devices do not currently have infrared thermocouples and similar features that can directly measure the tire's temperature, the tire temperature is estimated using various methods and some of the devices or abilities of the handheld device such as using information such as the ambient temperature, the length and speeds of the recent trip made by the vehicle under inspection and the weight loading of the vehicle. Some of this information may be obtained through Internet access and using GPS features found in many handheld devices.

Reference is now made to FIG. 1, which is a block diagram, schematically illustrating a system 100 for estimating pneumatic pressure state of vehicles' tires using a user's handheld device 50 such as a mobile phone (e.g. smartphone), tablet device and the like, according to some embodiments of the present invention.

The system 100 includes a tire pressure application 110 operable through the handheld device 50 and one or more data storage units such as a database 150. The application is configured for allowing a user of the handheld device 50 to photograph (acquire an image of) a wheel of a vehicle, estimate the pneumatic pressure state of the tire of the respective photographed wheel by analyzing the image thereof and output the resulting pressure state to the user via his/her handheld device 50.

The handheld device may be any device that is equipped with one or more optical sensors such as cameras and optionally also has communication functionality serving as a communication device by using one or more communication technologies and/or links such as the internet, wireless telecommunication and the like. The handheld device 50 allows input and output of data via one or more input and output devices of the handheld device 50 such as a screen, a keyboard, touch screen, touch pad, speakers and the like.

According to some embodiments, as illustrated in FIG. 1, the tire pressure application 110 operates several modules: (i) an image acquisition module 111 configured for allowing a user to acquire an image of the vehicle wheel, using camera and image acquisition functionality of the handheld 50, said image acquisition module comprises a user interface that provides visual graphics configured to assist the user in directing the positioning of the handheld device in respect to the respective wheel for acquiring its image; (ii); an image analysis module 112 configured for receiving an image of a respective wheel from the image acquisition module 111 and analyzing each received image for estimating the pneumatic pressure state of a tire of the wheel in the respective image; and (iii) a presentation module 113 for presenting the estimated pneumatic pressure state of the respective tire via at least one output device of the handheld device 50 such as through its screen.

According to some embodiments of the invention, the image acquisition module 111 further allows a user to input data that is required for estimating the respective tire's pneumatic pressure state such as the vehicle type and/or the location of the wheel (front/rear). Each vehicle manufacturer often recommends tire pneumatic pressure for each vehicle type thereof and for many vehicles each location (front/rear) of the tire has a different recommended pneumatic pressure. The recommended pressure values (often given in PSI units) are related to a properly inflated tire under "normal conditions" such as normal temperature range between 10-35° C., normal speed range and the like.

To estimate the pneumatic pressure state of the photographed tire, the application 110 may first receive input data indicating the vehicle type and optionally also the tire location (front/or rear) and then measure one or more parameters of the tire via image analysis such as the sidewall height and/or footprint thereof. To do so, the image analysis module 112 may first identify outer and inner perimeters of the tire in the image and then measure the one or more parameters. Once the value parameter is measured or estimated (this parameter is referred to in this document as the "estimated parameter"), the estimated parameter value is compared with value of a reference known parameter for a properly inflated tire of the same vehicle type and tire location stored in the database. Alternatively a predefined equation that can calculate the pneumatic pressure value (e.g. in PSI) of the respective tire that is tested is used using also the value of the estimated parameter and then the image analysis module 112 compares the pneumatic pressure value with that of a properly inflated tire of the same vehicle and tire information taken from the database 150.

According to some embodiments of the invention, as illustrated in FIG. 1, the system further includes a remote server 120 communicable with the application 110 through the handheld device's 50 communication abilities and links such as through wireless communication link 99 for allowing carrying out some of the operations of the application 110 such as the image processing over the remote server 120.

The remote server 120 may be configured to support, for example, a designated website of the respective application 110 enabling users to download and operate the application 110 or to access web accounts through their handheld devices by providing the users with pressure state calculating services requiring them to simply upload the image of the tire from their handheld devices and input the vehicle type and optionally also the tire information for allowing all calculations to be carried out at the remote server 120. The resulting pneumatic pressure state is then presented to the user through his/her handheld device by any one or more presentation technique or means such as by sending a message to the handheld device of the user for allowing him/her to be alerted regarding the state of the tire (e.g. through short messaging service (SMS); Media messaging service (MMS); email; and/or over a webpage of the website itself). A communication module 114 of the application may allow using the communicational abilities and devices of the handheld device 50 of the user for communicating with the remote server 120.

According to some embodiments of the invention, the application 110 also enables retrieving data from other applications and/or devices installed at the handheld device 50 such as positioning data from the GPS of the device 50, information regarding the weather (meteorological data), other systems installed in the handheld device 50 that can measure the orientation thereof and the like. Some of the data such as the meteorological data can be retrieved from a designated website by accessing a webpage thereof through a web connection of the handheld device 50. This additional data may then be used to improve assessment of the tire's state in respect to the vehicle's driving conditions. The term "driving conditions" refers to conditions such as the weight of the vehicle, the temperature of its tires or of the road and the like. These conditions can affect either the values of the reference properly inflated tires to which the estimated values should be compared (e.g. in a case of a heavier vehicle fully loaded with passengers or any other load the recommended inflation rate may be much higher than for the same vehicle and tire which is not fully loaded).

According to some embodiments, the system 100 further enables monitoring the user's vehicle tires by recording each event of tire pneumatic pressure estimation and tracking the details of these events. For example, the estimated value of the pneumatic pressure of each of the user's tires may be registered along with the date of its testing, where if a new estimation was not made after a predefined period from the last estimation, a notification message may be sent to the user, reminding him/her that his/her tires should be checked. These data can be stored in the remote server 120 allowing monitoring a multiplicity of vehicles of a multiplicity of users.

The recorded events and their timing association may also be used for carrying out statistical analysis, for example, for updating references' values and/or for identifying driving patterns of the user such as typical driving speeds, weight loads and the like and the like.

According to some embodiments, the image acquisition module 111 also allows retrieving (e.g. by uploading) images of wheels already acquired and stored for analyzing them to estimate the pneumatic pressure of the tires of the wheels captured therein. To do so, the GUI 40 allows an upload option for allowing the user to browse through archives (e.g. stored at the handheld device 50 and/or from a remote web library be communicating therewith) to locate and select an image for analyzing. This may allow users to send images of their wheels to one another to allow other users to use their installed or uploaded applications to estimate the pneumatic pressure state of tires.

According to some embodiments of the invention, the application 110 further enables identifying severely underinflated tires by identifying a tire having a very short sidewall height and a very wide footprint length (in comparison to reference dimension of the tire and wheel) without requiring identification of the vehicle type and/or the tire location and/or other details of the tire configuration. The application 110 provides a quick tire check mode requiring no input information or further image processing for identifying the vehicle type and/or the tire configuration, allowing receiving an image of the tire and analyzing it for measuring (identifying) its sidewall height and footprint length for identifying extreme underinflated tire states. Once extreme underinflated tire situation is identified an alert is outputted through the output device(s) of the handheld device 50.

Figure 2:
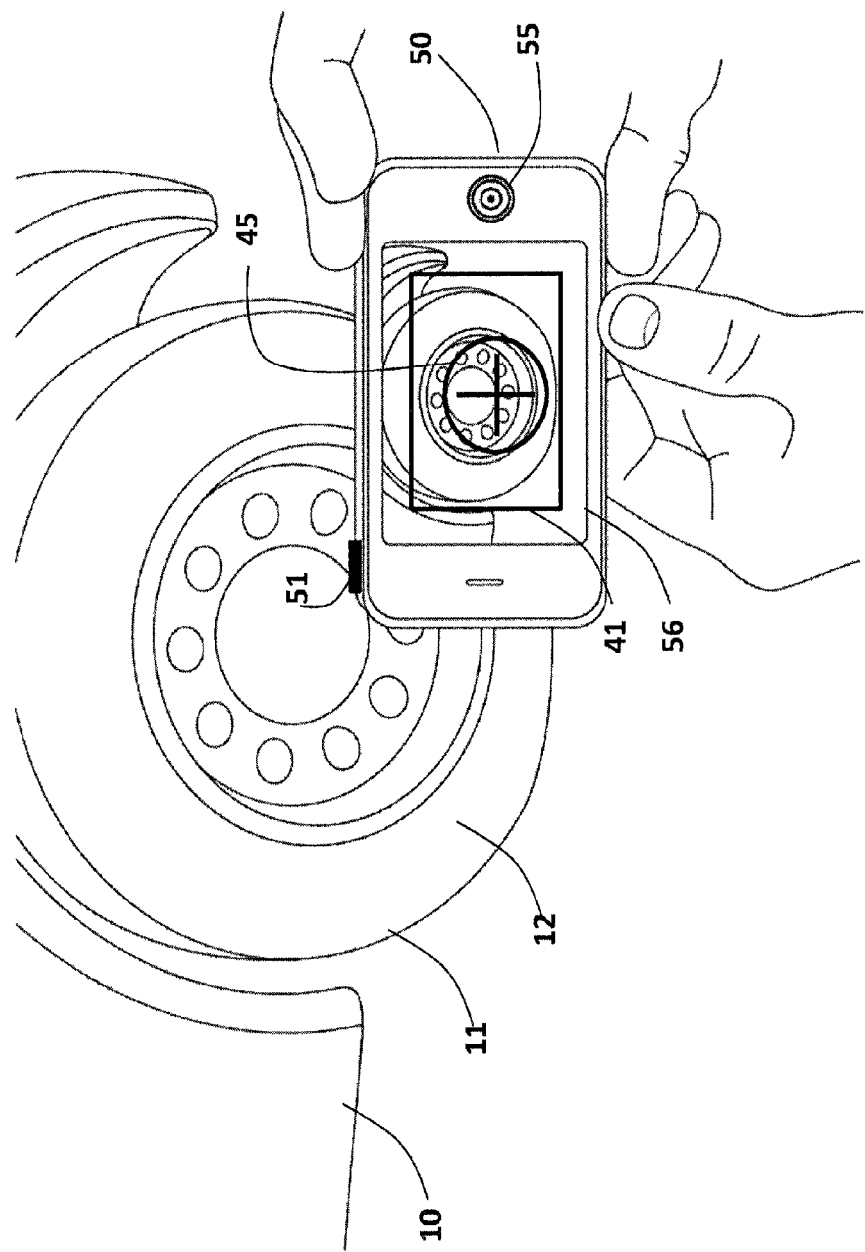
FIG. 2 shows how a user uses an application of the system operable through the user smartphone for positioning the smartphone and its camera in respect to a vehicle wheel, through a designated graphical user interface, according to some embodiments of the invention.

FIG. 2 shows how a user uses an application of the system operable through the user handheld device 50 for positioning the handheld device 50 and its camera 51 in respect to a wheel 11 of a vehicle 10, through a designated graphical user interface of the application 110, according to some embodiments of the invention to estimate the pneumatic pressure of the wheels' 11 tire 12. It is illustrated that the GUI provides a visual indication over the handheld device's 50 screen 56 showing the real time image 31 captured by the camera 51 and the GUI markings. For example, the GUI markings may include a frame 41 and a centralizing marker 45 including a circle and a cross positioned at the center of the circle. The user may be required and instructed to turn the handheld device 50 and therefore the camera 51 installed therein/thereover until he/she sees that the center of the image of the wheel is located at the center of the cross of the marker 45 and that all the wheel is captured within the frame 41. Once these conditions are fulfilled, the user can acquire the image by pressing a virtual or real press button 55 of the camera application of the device 50. According to some embodiments, the application 110 executes an automatic preliminary process in which it carries out real time or near real time image processing of the image in the frame before the image is acquired and stored, while the user positions the handheld device 50, to allow automatically identifying in real time/near real time if the positioning of the handheld device 50 in respect to the wheel 11 is satisfying (meaning that the wheel is substantially coaxial with the camera 51 focal plane in respect to the rotation axis of the wheel. Once the preliminary process identifies a positioning that is substantially optimal the image is automatically acquired without requiring the user to press the acquisition button 55.

The acquired image is then further analyzed to estimate the pneumatic pressure state of the tire of the wheel in the image as explained above.

Figure 3B:
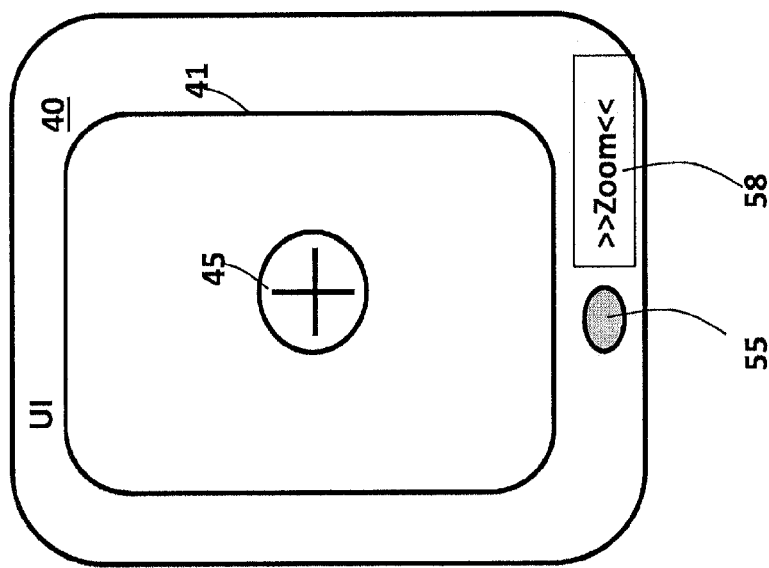
FIG. 3B schematically illustrates a screenshot of the application, showing a marker of the user interface used for centralizing the image of the wheel as appearing in the camera screen in real time as the user positions the camera, according to some embodiments of the present invention.
Figure 3A:
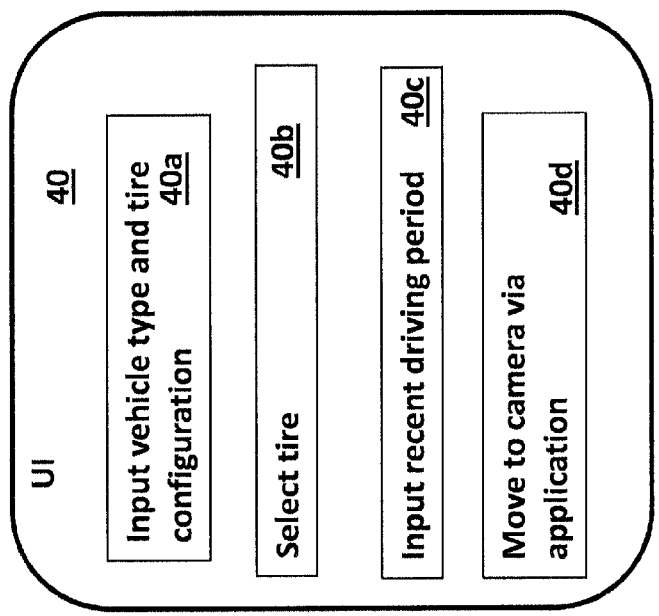
FIG. 3A schematically illustrates a user interface for a system for estimating and presenting pneumatic pressure in vehicles' tires, according to some embodiments of the present invention.

Reference is now made to FIG. 3A schematically illustrating a user interface (UI) 40 for a system for estimating and presenting pneumatic pressure in vehicles' tires, according to some embodiments of the present invention. The UI 40 includes various input fields such as vehicle type and tire configuration input field 40a; tire information input field 40b; recent driving period input field 40c; and an image acquisition link 40d for entering the image acquisition interface 40. Optionally, the tire information input field 40b allows inputting both the location of the tire (rear/front and optionally also right/left) as well as the size of the tire including its inner diameter, width and aspect ratio. The database of the system, in this case includes the known dimensions for each tire associated with each vehicle's type and tire location for allowing identifying these elements in the image of the photographed wheel, which can, in embodiments of the present invention, select the appropriate tire used in the car, without having the user manually enter or select it.

The vehicle type and tire input fields 40a and 40b are configured to allow the user to input the type of the vehicle, the tire configuration and the tire location. The tire location field 40b may be a selection field allowing the user to choose one of two options: front or rear. The vehicle type may allow inputting free text. The recent driving period input field 40c allows indicating if the vehicle has been recently driven and for how long to estimate the tire's temperature, which may influence the recommended pneumatic pressure state of the tire.

FIG. 3B schematically illustrates a screenshot of the UI 40, showing the centralizing marker 45 and frame 41 used for centralizing the image of the wheel as appearing in the camera screen in real time as the user positions the camera as well as the acquisition button 55 and zoom interface options 58 of the camera interface. This UI 40 screenshot illustrates how the UI 40 is integrated into the interface presentation of the camera 51 of the handheld device 50 by actually presenting its markers over the camera display in real time.

Figure 4A:
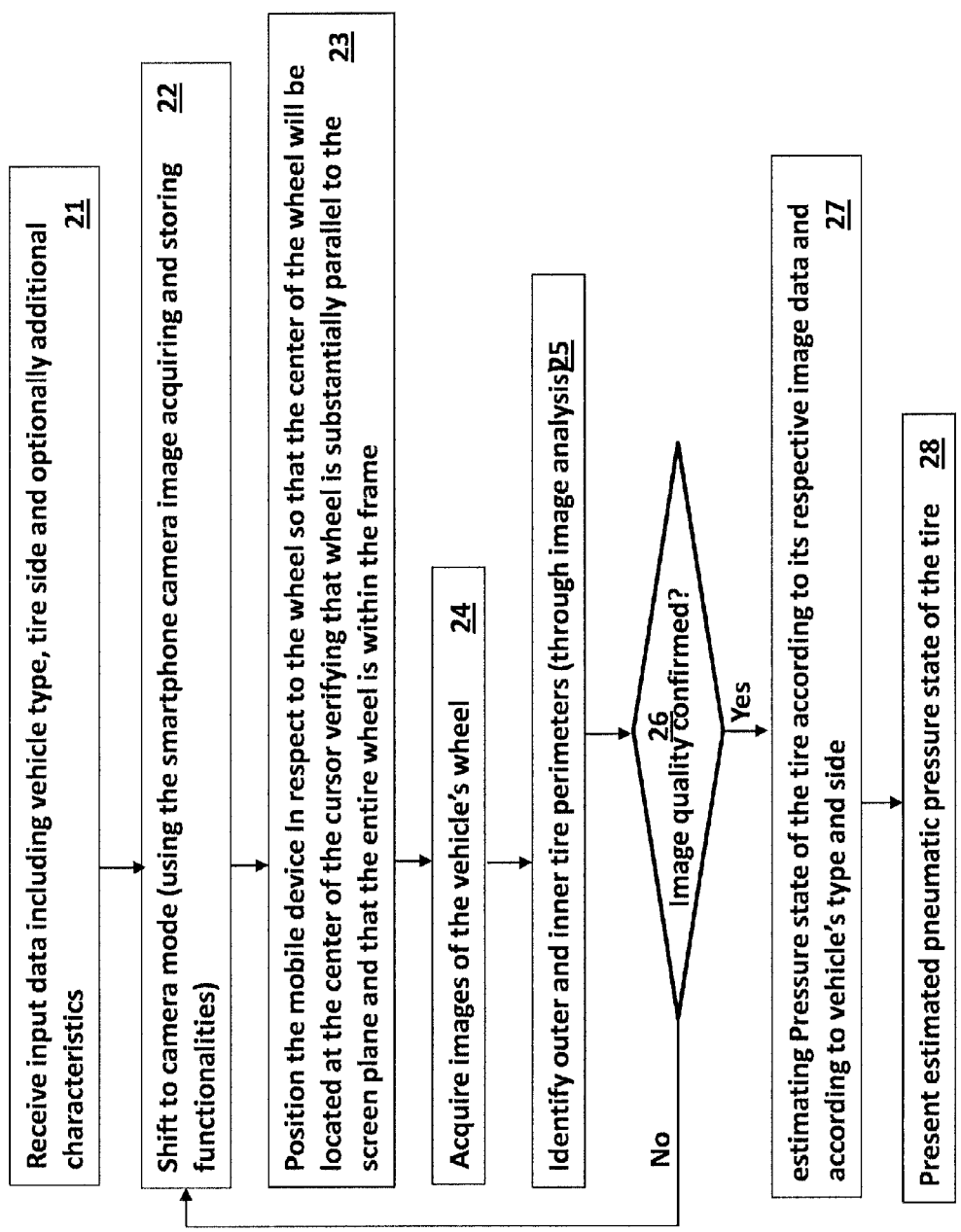
FIG. 4A is a flowchart, schematically illustrating a process for estimating and presenting pneumatic pressure in vehicles' tires by using a designated application for a handheld device, according to some embodiments of the present invention.

FIG. 4A is a flowchart, schematically illustrating a process for estimating and presenting pneumatic pressure in vehicles' tires by using a designated application for handheld devices, according to some embodiments of the present invention. The process includes receiving input data indicative of the type of the vehicle and the tire location of the respective vehicle 21; shifting to camera mode 22 for displaying the camera image in real time for acquiring an image of the respective wheel; adjusting positioning of the handheld device in respect to the stationary position of the wheel 23 so that the center of the wheel will be coaxial with the focal plane of the camera and so that the entire wheel will be captured within the image frame, optionally using a GUI centralizing marker and frame; acquiring an image of the wheel once the image is correctly positioned 24; identifying outer perimeter of the wheel and optionally also inner perimeter of the wheel's tire in the acquired image, using image analysis 25; and estimating the pneumatic pressure state of the respective tire 27 using parameter(s) measured from the tire image, once the image was verified to be of sufficient quality 26. Once the pneumatic pressure state is estimated an indication thereof is presented 28 through the user's handheld device (e.g. over its screen).

Figure 4B:
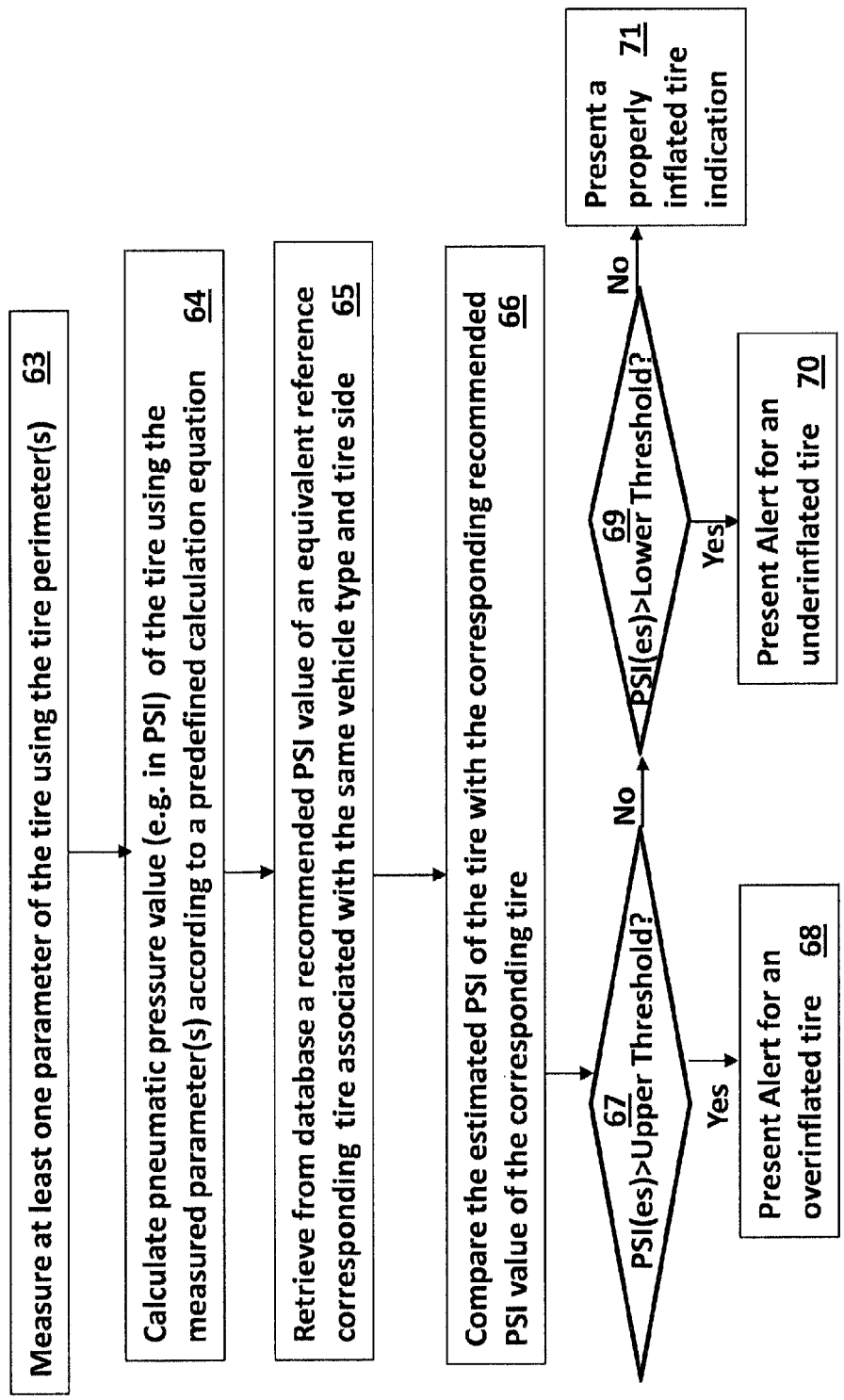
FIG. 4B is a flowchart, schematically illustrating a detailed process for estimating and presenting pneumatic pressure in a vehicles' tire by using one or more predefined parameters measurable through image processing of an image thereof, according to some embodiments of the present invention.

FIG. 4B is a flowchart, schematically illustrating a detailed process for estimating the pneumatic pressure in a vehicles' tire, according to some embodiments of the present invention. This process refers to a stage in which the outer and optionally inner perimeter of the tire in the wheel image have already been identified in the image analysis process. The estimation process includes measuring one or more parameters such as the footprint length or the sidewall height. Once one or more of the parameters have been measured through the image analysis 63, one or more calculations are used to calculate the pneumatic pressure value (e.g. in PSI) of the respective tire, using the value of the estimated parameter in one or more predefined equations for calculating the pneumatic pressure value 64.

According to some embodiments of the invention, the equation used can be taken from experiments that check, for each vehicle type and optionally for each tire configuration of each vehicle type, the mathematical relation between the respective parameter (e.g. footprint or sidewall height) and the pneumatic pressure of the tire.

Once the pneumatic pressure of the respective tire is estimated 64, pneumatic pressure value of a reference properly inflated tire (of the same vehicle type and tire configuration) which can be the manufacturer's recommended pressure value, is retrieved from a designated database 65 to allow comparing the estimated pneumatic pressure value with the reference one 66. If the value of the estimated pressure is higher than a predefined upper threshold value pneumatic pressure of the respective tire 67, an alert is presented through the screen of the handheld device, indicating that the tire is overinflated 68 optionally also indicating the estimated pneumatic pressure of the tire and the difference between the estimated value and a recommended reference value of the respective tire; If the value of the estimated pressure is lower than a predefined lower threshold 69, an alert is presented indicating that the tire is underinflated 70 optionally also indicating the estimated pneumatic pressure of the tire and the difference between the estimated value and a recommended reference value of the respective tire; and if the value of the estimated pressure does not exceed any of the upper and lower thresholds, a properly inflated tire alert is presented 71 optionally also indicating the estimated pneumatic pressure of the vehicle. Multiple thresholds may also be defined as to differentiate between under/over inflated tires and severely under/over inflated tires.

Reference is now made to FIGS. 5A-5C, which show how the pneumatic pressure level of a tire influences the footprint of the tire. FIG. 5A shows a photograph of a vehicle's tire inflated to 34 PSI (pounds per square inch); FIG. 5B shows a photograph of the same tire inflated to 24 PSI; and FIG. 5C shows a photograph of the same tire inflated to 15 PSI. It is clear from these photographed experiments that the footprint lengthens with the decreasing of the tire's pneumatic pressure.

Figure 6B:
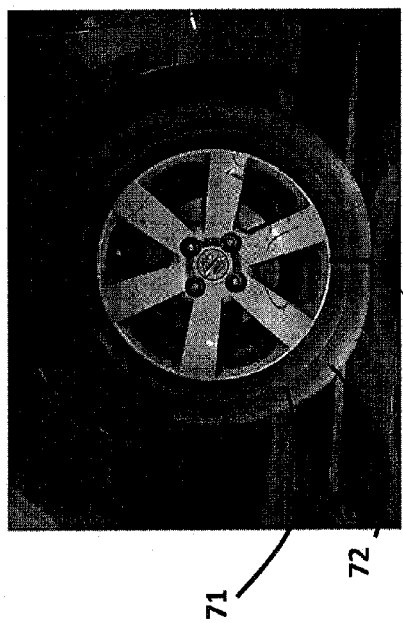
FIGS. 6A-6C include documented pictures showing how the pneumatic pressure level of a tire influences the sidewall height measured between the touch point between the tire and road/ground and a the inner side of the tire.
Figure 6A:
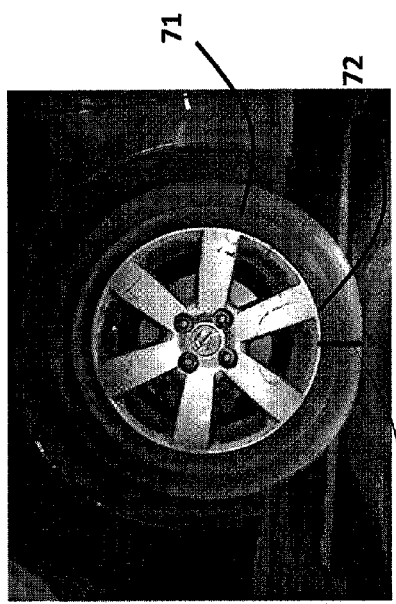
Figure 6C:
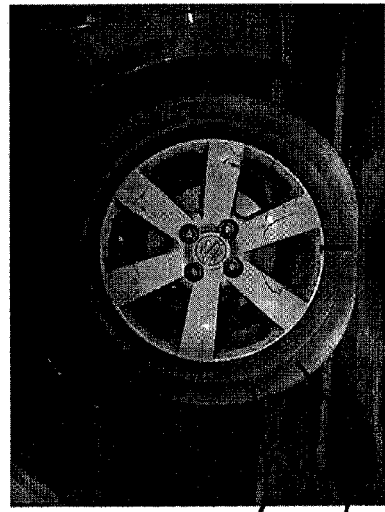

FIGS. 6A-6C show how the pneumatic pressure level of a tire influences the sidewall height measured between the touch point between the tire and road/ground and the inner side of the tire: FIG. 6A shows a photograph of a vehicle's tire inflated to 39 PSI (pounds per square inch); FIG. 6B shows a photograph of the same tire inflated to 27 PSI; and FIG. 6C shows a photograph of the same tire inflated to 15 PSI. It is clear from these photographed experiments that the sidewall height increases when the tire's pneumatic pressure is increased.

These experiments may be taken for many vehicles' front and rear tires to establish a table (to be stored in a computerized data storage unit such as a database) associating the vehicle's type, tire dimensions and location (rear/front), recommended pneumatic pressure value and its associated footprint length and/or sidewall height. This will allow carrying an image processing of the respective tire for measuring the respective parameter(s) (footprint length, and/or sidewall height) and then checking the resulting value(s) thereof with the standard parameter(s) value(s) of the tire of the same configuration and vehicle type. This table may additionally include the values of these parameters and of the recommended pneumatic pressure for the same tire (of the same configuration and vehicle type) under various "tire conditions" such as under various tire temperatures and/or vehicle weight, for which the pneumatic pressure values and therefore the respective parameters' values vary correspondently. Experiments for one vehicle type may be used for a set of vehicles of different types as many vehicles share similar tire configurations, dimensions, weights and recommended pneumatic pressure values.

Figure 7:
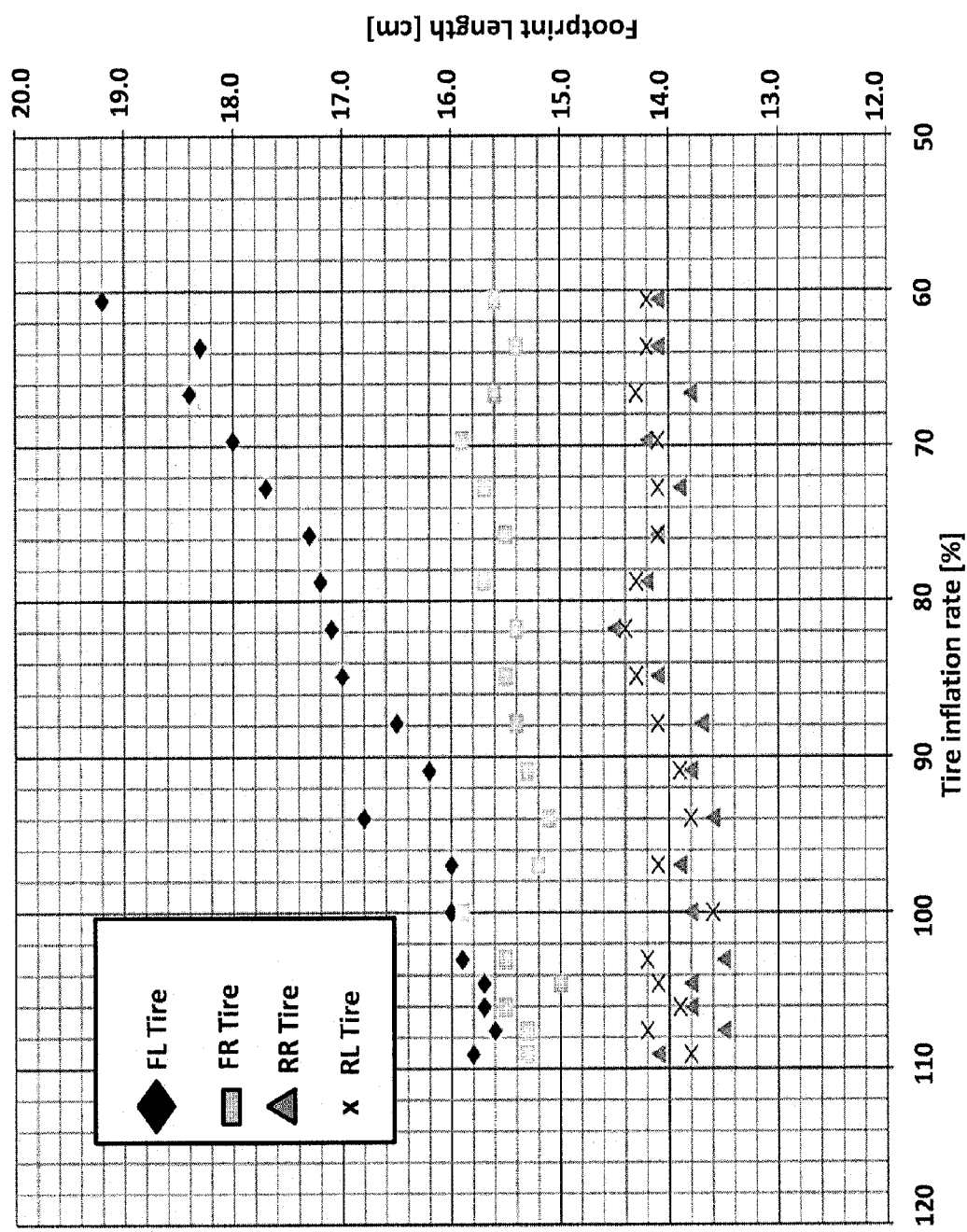
FIG. 7 shows experimental results of the relation between the footprint length of the four tires of a vehicle, following the deflation of the front left tire.
Figure 8:
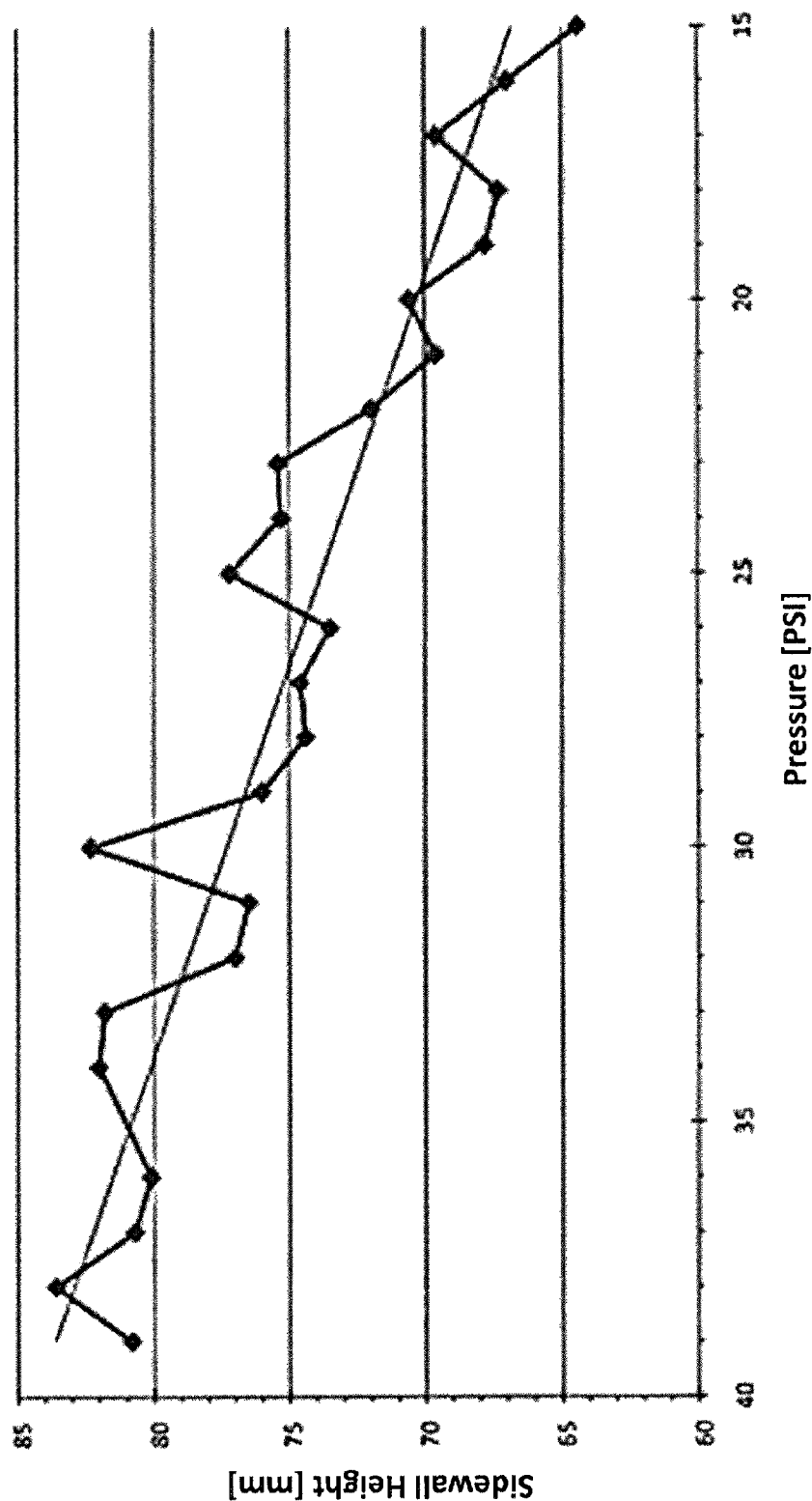
FIG. 8 shows experimental results indicating the relation between the sidewall height and the pneumatic pressure level and linearization result of the experimental measurements for extracting a mathematical relation between the sidewall height and the pneumatic pressure level of a tire.

The graphs in FIGS. 7-8 show experimental results testing the relation between one of the above-mentioned parameters with the pneumatic pressure level of the tires. FIG. 7 shows the relation between the inflation rate (pneumatic pressure in the tire) and the footprint length for four tires of the same vehicle (left-rear, right-rear, left-front and right-front) and how one deflated tire (front left in this example) only affects its own footprint, practically, without affecting the footprint of the other tires.

FIG. 8 shows the relation between the pressure value in [PSI] and the sidewall height for one of the vehicle's tires, where the higher the pneumatic pressure the larger the sidewall height. FIG. 8 also illustrates how the experimental points can be processed (e.g. through polynomization) to numerically identify the equation indicative of the relation between the tire pneumatic pressure value and its sidewall height. In this example a linearization (regression) was made revealing the coefficients A and B of the linear equation: Y=AX+B, where Y is the sidewall height and X is the pneumatic pressure value. This equation will allow extracting the pneumatic pressure by estimating the sidewall height (through image analysis as explained above). Similar equation identification can be made with the experimental results for other parameters such as for the footprint length.

The image analysis may include a preliminary quality test procedure in which each acquired image is tested to check for defects therein and verify whether or not it passes at least one predefined quality criteria. In this process, upon failure of an image to pass one or more of the tested criteria the camera that has acquired this image is readjusted (e.g. by readjusting its zoom and/or camera orientation, operating illumination means of the handheld device such as a torch feature and the like) according to the detected defects for acquiring a new image of the respective wheel.

This process may include verifying that: (i) the image is of a satisfying quality; (ii) the wheel image is not over-tilted or distorted in any other manner so that its desired features, from which the parameters are extracted/calculated such as the tire's inner and outer circumference outlines, are not too distorted.

The distortion defects such as tilted positioning of the wheel in respect to the camera can be corrected via image analysis or, if the distortion is too strong, the respective camera, photographing the specific wheel may be re-operated to adjust its zoom and/or orientation to acquire a better image of the respective wheel.

According to some embodiments, to measure the footprint length or sidewall height the image measure value (which can be measured by number of pixels for instance) may be converted to the real tire scale (e.g. revealing the actual tire with the tire in cm or any other measure unit). To convert the scale of the image to a real scale Hough transformation algorithms may be used, where proportions are determined by comparing the pixel size of an item of a known size such as the rim, or even the bolts that connect the wheel to the car, to their real known physical size, by measuring the range between the camera or sensors to the object or by other means that are known to those skilled in the art.

According to other embodiments of the invention, the measured parameter value is compared with a reference known value of the same parameter for a properly inflated equivalent tire of the same vehicle type and tire configuration where since the relation between the inflation rate and the parameter value is statistically and experimentally documented the comparison is carried out between those measured and known parameters to estimate the pneumatic pressure state in a more general manner without calculating the exact pneumatic pressure value of the tested tire. For example, since the less the tire is inflated the longer its footprint—the measured footprint length may be compared with a known footprint length taken for a properly inflated tire, where if the measured footprint length is shorter than that of the known one an indication that the tested tire is overinflated and if the measured footprint length is longer that the known one, an indication that the tire is underinflated is outputted/presented.

When using computer based image processing, some embodiments of the present invention might be sensitive to light and shade so appropriate lighting may need to be provided by using light means such as flash of the handheld device.

According to some embodiments more than one parameter can be measured each used for separately calculating the tire's pneumatic pressure, where these several results are then averaged to achieve a more accurate estimation.

Figure 9:
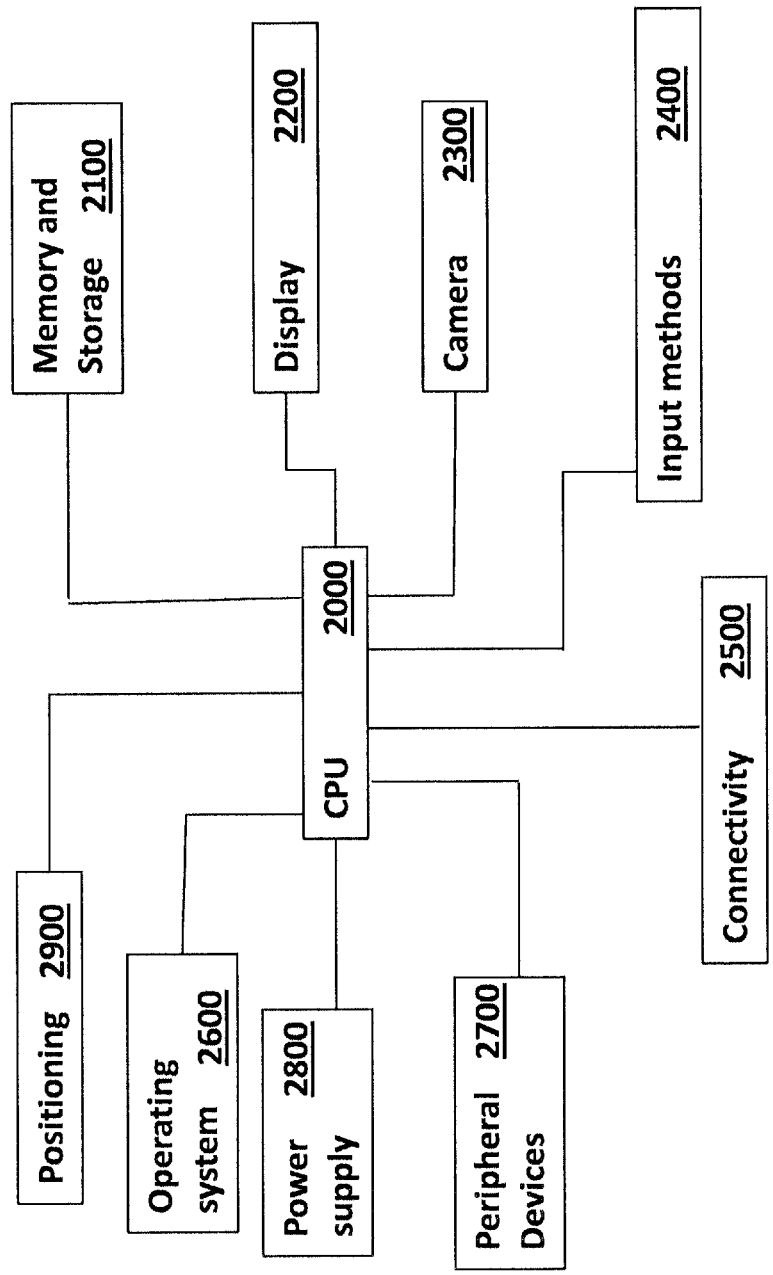
FIG. 9 shows architecture of a system for estimating pneumatic pressure of vehicle tires operable through a handheld device, according to some embodiments of the invention.

Reference is now made to FIG. 9, which schematically illustrates the architecture of a system for estimating pneumatic pressure state of a tire, according to some embodiments of the invention.

The system combined with the handheld device includes a central processing unit (CPU) 2000 operable through an operating system 2600 that is connected to a power supply 2800 in the form of an internal battery or external power source, memory and storage 2100 including optional memory and storage in the form of peripherals such as micro SD cards, flash and other commercially available products, via which software and vehicle databases can be loaded or stored, a display 2200, such as a screen, touch screen and the like, input methods 2400 such as a keypad, touch screen having virtual input platforms or other commercially available solutions, a camera 2300 that may include a flash illumination, auto focus and additional features such as zooming, autofocus and the like.

The system may include positioning unit 2900 such as a GPS or the use of cellular based positioning to support location-based calculations. The positioning unit 2900 may further include built in tilt and acceleration sensors that can make sure the image frame is taken at a near vertical position and that the device is not in too much motion, which can result is a blurry image frame.

The system includes connectivity abilities 2500 based on one or more commercial wireless and wired connection protocols and may include cellular data. The connectivity modules may enable logging results on a remote server, notifying the driver or other persons of interest, synching and downloading data and updates to the system. The system also includes an operating system, which integrates the hardware and allows for the execution of software applications. The system may be connected to additional peripheral devices 2700 such as lights, speakers, laser range detectors, infrared temperature sensors and any commercially available peripheral that can be supported by the hardware and software of the system.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments and/or by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

What is claimed is:

1. A system for estimating pneumatic pressure state of vehicle tires using a handheld device having at least one camera installed therein, said system comprising:
    an image acquisition module configured for allowing a user to acquire an image of a vehicle wheel, using the camera and image acquisition functionality of the handheld device, said acquiring comprising:
    (i) iteratively, based on a video stream received from said camera:
        (1) analyzing a frame of the video, to determine (a) an orientation between an axis of said at least one of wheel and a focal axis of said camera, (b) a center distance of said at least one wheel in the frame, and (c) whether the frame contains a complete wheel capture,
        (2) presenting a marking on a display of said handheld device, the marking instructing the user of said handheld device to turn said handheld device for said acquiring, and
    (ii) acquiring said image when said orientation is substantially coaxial and said at least one wheel is substantially centered in said frame;
    an image analysis module configured for receiving said image from said image acquisition module and analyzing said image for estimating the pneumatic pressure state of a tire of the wheel in said image; and
    a presentation module for presenting the estimated pneumatic pressure state of the tire via said display of said handheld device.

2. The system according to claim 1, wherein said image analysis is carried out by using at least one processor of the handheld device.

3. The system according to claim 1 further comprising a communication module for communicating with at least one remote server through at least one communication link provided by the handheld device, wherein said image analysis is carried out by using at least one processor of said at least one remote server.

4. The system according to claim 1, wherein said image analysis comprises measuring value of at least one pre-defined parameter of the tire from its image and comparing the measured parameter value with a reference known parameter value, wherein said system further enables accessing at least one database comprising known parameters values.

5. The system according to claim 4, wherein said at least one parameter is at least one of: footprint length, sidewall height, each indicates the length or height, at the bottom part of the tire that is in contact with the ground.

6. The system according to claim 1, wherein a user interface further enables the user to input information through at least one input device of said handheld device, said information is indicative of a type of the vehicle, wherein said estimation of the tire pneumatic pressure state is carried out according to said input information.

7. The system according to claim 6, wherein said user interface is also configured to allow inputting location and/or size of the wheel, said pneumatic pressure estimation is carried out also according to said location and/or size of the wheel.

8. The system according to claim 1 is further configured to extract data from at least one positioning system of the handheld device, allowing a user interface to present said positioning data for assisting the user in positioning the handheld device and said image analysis module to use the extracted data for correcting image distortions caused due to inaccuracy in the positioning of the device in respect to the wheel when image was acquired to improve pneumatic pressure state estimation.

9. The system according to claim 1, wherein said image acquisition module and a user interface further enable retrieval of wheel images from a data storage for analyzing thereof.

10. A method of estimating pneumatic pressure in tires of vehicles, using a handheld device having at least one camera installed therein, said method comprising:
    acquiring an image of at least one of wheel of a vehicle, using at least one camera of the handheld device, said acquiring comprising:
    (i) iteratively, based on a video stream received from said camera:
        (1) analyzing a frame of the video, to determine (a) an orientation between an axis of said at least one of wheel and a focal axis of said camera, (b) a center distance of said at least one wheel in the frame, and (c) whether the frame contains a complete wheel capture,
        (2) presenting a marking on a display of said handheld device, the marking instructing a user of said handheld device to turn said handheld device for said acquiring, and
    (ii) acquiring said image when said orientation is substantially coaxial and said at least one wheel is substantially centered in said frame;
    analyzing said image for estimating value of at least one parameter of said tire related to pneumatic pressure thereof;
    estimating pneumatic pressure state of the tire by using said parameter; and
    presenting an indication of said estimated pneumatic pressure state, using said display of the handheld device.

11. The method according to claim 10, wherein said at least one parameter comprises at least one of: footprint length; footprint angle; sidewall height.

12. The method according to claim 10 further comprising identifying: type of the vehicle, location of the tire of the image, and size of the tire of the image, wherein said pneumatic pressure estimation is carried out by also using said vehicle type and tire location and size to compare estimated pneumatic pressure state with a reference pneumatic pressure of a properly inflated tire of the same vehicle type and tire location and size.

13. The method according to claim 12, wherein said identification of the vehicle type and tire location is done by at least one of: automatically identifying the vehicle by using at least one sensor for sensing at least one parameter associated with the type of the vehicle; receiving input data indicative of the type of the vehicle and the tire location.

14. The method according to claim 10 further comprising identifying image quality level, wherein said image analysis is carried out once the image quality exceeds predefined criteria.

15. The method according to claim 10 further comprising transmitting an alert message to the handheld device of the user, said message is indicative of the pneumatic pressure state of the tire.

16. The method according to claim 10 further comprising retrieving data from at least one data source through said handheld device for estimating temperature change of the tire, wherein said estimating of the pneumatic pressure state of the tire is carried out also according to said estimated temperature change thereof.

17. The method according to claim 10 further comprising monitoring the user's vehicle tire by recording each event of tire pneumatic pressure estimation and its timing.

18. The method according to claim 10 further comprising retrieving a wheel image from data storage.

19. A computer operable application for estimating pneumatic pressure state of vehicle tires using a handheld device having at least one camera installed therein, said application comprising:
- an image acquisition module configured for allowing a user to acquire an image of a vehicle wheel, using the camera and image acquisition functionality of the handheld device, said acquiring comprising:
  - (i) iteratively, based on a video stream received from said camera:
    - (1) analyzing a frame of the video, to determine (a) an orientation between an axis of said at least one of wheel and a focal axis of said camera, (b) a center distance of said at least one wheel in the frame, and (c) whether the frame contains a complete wheel capture,
    - (2) presenting a marking on a display of said handheld device, the marking instructing the user of said handheld device to turn said handheld device for said acquiring, and
  - (ii) acquiring said image when said orientation is substantially coaxial and said at least one wheel is substantially centered in said frame;
- an image analysis module configured for receiving said image of a wheel from said image acquisition module and analyzing said image for estimating the pneumatic pressure state of a tire of the wheel in said image; and
- a presentation module for presenting the estimated pneumatic pressure state of the tire via said display of said handheld device.

* * * * *

UNITED STATES PATENT AND TRADEMARK OFFICE
CERTIFICATE OF CORRECTION

PATENT NO. : 9,500,550 B2
APPLICATION NO. : 14/357063
DATED : November 22, 2016
INVENTOR(S) : Kfir Wittmann Page 1 of 1

It is certified that error appears in the above-identified patent and that said Letters Patent is hereby corrected as shown below:

On the Title Page

Item (73) The Assignee whose name reads "NOMATIX LTD." should read --NEOMATIX LTD.--

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*